United States Patent [19]
Caldwell et al.

[11] Patent Number: 6,103,360
[45] Date of Patent: Aug. 15, 2000

[54] HIGH LIGHT REFLECTANCE AND DURABLE CEILING BOARD COATING

[75] Inventors: Kenneth G. Caldwell, Mountville; Raymond H. Fernando, Lancaster, both of Pa.

[73] Assignee: Armstrong World Industries, Inc., Lancaster, Pa.

[21] Appl. No.: 09/005,386

[22] Filed: Jan. 9, 1998

[51] Int. Cl.$^7$ ....................................................... B32B 5/16
[52] U.S. Cl. .................... 428/323; 106/401; 106/436; 106/442; 106/444; 106/446; 106/447; 106/448; 106/449; 106/464; 106/468; 106/486; 106/487; 428/328; 428/330; 428/331
[58] Field of Search ...................................... 428/323, 328, 428/330, 331; 106/401, 436, 442, 444, 446, 447, 448, 449, 464, 468, 486, 487

[56] References Cited

U.S. PATENT DOCUMENTS

| | | | |
|---|---|---|---|
| 4,353,949 | 10/1982 | Kyminas et al. | 428/195 |
| 4,559,377 | 12/1985 | Gleason et al. | 524/44 |
| 4,572,862 | 2/1986 | Ellis | 428/245 |
| 4,695,507 | 9/1987 | Schwartz | 428/228 |
| 4,726,986 | 2/1988 | Cannady et al. | 428/278 |
| 4,861,822 | 8/1989 | Keskey et al. | 524/559 |
| 5,047,463 | 9/1991 | Keskey et al. | 524/426 |
| 5,441,792 | 8/1995 | Brown | 428/170 |
| 5,534,095 | 7/1996 | Brown | 256/209 |

*Primary Examiner*—Hoa T. Le
*Attorney, Agent, or Firm*—Womble Carlyle Sandridge & Rice, PLLC

[57] ABSTRACT

A ceiling board coating composition includes water, a binder and a filler, said filler having large particles with an average particle size of a minimum of about 50 microns, medium particles with an average particle size in the range of from about 1.2 to about 30 microns, and small particles which have an average particle size in the range of from about 0.1 to about 1.0 microns.

18 Claims, No Drawings

HIGH LIGHT REFLECTANCE AND DURABLE CEILING BOARD COATING

BACKGROUND OF THE INVENTION

Field of the Invention

The invention is directed to a coating composition for ceiling boards. The coating described herein has the qualities of high light reflectance and durability.

Paint coatings used on ceiling boards require special characteristics which are desired for the board. Durability and high light reflectance are two of the most important. A ceiling tile coating having these characteristics are highly beneficial.

Known coatings for ceiling boards include a coating described by U.S. Pat. No. 5,674,594 which is for acoustical ceiling board. This paint coating contains a latex emulsion and filler particles of two different sizes; from about 40 to 150 mesh and 325 mesh and finer.

Another coating is described in U.S. Pat. No. 4,900,611. This coating contains light reflective flakes which are from about 10 to 100 microns across.

U.S. Pat. No. 3,755,238 contains particles of a finely divided polyolefin; these particles are less than 50 microns. Another patent, Great Britain 1,144,767, also describes a coating with small particles having a maximum size of about 44 microns.

SUMMARY OF THE INVENTION

A coating composition for ceiling boards comprises water, a binder and a filler, said filler having large particles with an average particle size of a minimum of about 50 microns, medium particles with an average particle size in the range of from about 1.2 to about 30 microns, and small particles which have an average particle size in the range of from about 0.1 to about 1.0 microns.

With the small particles, an average particle size less than about 0.1 microns is not used because it has been noted that when the average particle size less than about 0.1, the particles become virtually transparent and provide an unacceptable light reflectance.

It has also been noted that although it is possible to use a filler having the average particle size larger than about 300 microns in the coating composition, when this is done, the durability of the coating actually decreases. Thus, preferably, to maximize durability the large particles should have an average particle size in the range of from about 50 to about 300 microns.

From about 40 to about 70% of the total wet (liquid) coating volume will be in solids; this will allow a discontinuous coating to be produced by the composition. These solids include both the filler and particles in the binder which will coalesce into a solid when the coating dries. The dry filler content of the total wet (liquid) coating volume is from about 25 to about 65% (vol.).

DETAILED DESCRIPTION

Due to the presence of the three different particle sizes of filler the present coating composition gives a coating with both durability and high light reflectance. The large filler particles provide durability, and are present in an amount which is high enough to be effective to provide durability, but which is low enough to effectively allow the small and medium size particles to reflect the light. Durability can be measured by the scratch test described in the examples. Although a scratch resistance of 20 can be tolerated, it is preferred that the minimum level of performance on the test is 22, more preferably it is 25. The concentration of large particles can be as low as about 15% by dry solids volume to obtain a scratch resistance of 20. The large particles are preferably present in the composition at an amount in the range of from about 20 to about 55% of the total dry solids volume.

The small particles are present in an amount effective to provide some of the light reflectance which is needed for a coating composition that will give a dry coat having a light reflectance of at least about 0.84; when the small particles are present at a minimum amount of about 3% at least some of this light reflectance is provided. The maximum amount of small particles will be low enough to be effective to give the coating a viscosity that will allow the liquid coating to be spray applied. When the concentration of small particles is too high the coating composition is too viscus to allow spray coating. Since the maximum amount of small particles must be limited to keep the viscosity low, the small particle concentration by itself is not able to provide adequate light reflectance. Medium particles must be added in an amount necessary to be effective to bring the light reflectance to at least about 0.84 as measured by ASTM E1477-92.

Acceptably, the small particles are present in the composition at an amount in the range of from about 3 to about 25% of the total dry solids volume to reasonably enhance light reflectance. Even where a minimum acceptable light reflectance is desired, the small particles alone (without the medium sized particles) can not be used in a high enough amount to provide light reflectance since the viscosity of the coating composition would then be too high. The medium sized particles must be used.

The medium sized particles are present at an amount effective to give the coating a light reflectance of at least about 0.84 (preferably higher). With the present coatings, however, containing these three specific sizes of particles of filler (including extender particles), light reflectance values have been measured as high as 0.89 (using ASTM E 1477-92).

The medium sized particles are preferably present at a minimum amount of about 25% by dry solids volume; this will give a reasonably good light reflectance with a reasonably good (low) application viscosity to permit the spray coating application technique to be used. Spray coating can be done at viscosities up to about 10,000 centipoise (measured using the Brookfield viscometer at 10 revolutions per minute 20 (rpm).

Alternatively, however, the viscosity could be used at a somewhat higher level by decreasing the medium sized particles to about 22.5% by dry solids volume and using a higher concentration of the small particles. Preferably, however, the medium sized particles are present at an amount in the range of from about 25 to about 70% by dry solids volume.

Although the binder can be used at concentrations which will be familiar to those having ordinary skill in the art, it is preferred that the binder concentration of the coating be in the range of from about 2 to about 30% by weight; or more preferably from about 3 to about 50% by volume. The water can also be maintained at concentrations familiar to those having ordinary skill in the art; preferably, however, the water can be used at an amount in the range of from about 5 to about 30% by total wet volume or from about 3 to about 20% by weight.

The coatings of the present invention will preferably include a dispersing agent. These can also be used at an amount familiar to those having ordinary skill in the art. Preferably, however, the dispersing agent is present at an amount up to about 3% by total wet volume, or more preferably in the range of from about 0.5 to about 2.5% by total weight (wt) of the liquid coating.

The coatings of the present invention will also preferably include a thickening agent. These can also be used at an amount familiar to those having ordinary skill in the art. Preferably, however, the thickening agent is present at an amount up to about 3% by total wet volume, or more preferably in the range of from about 0.2 to about 2.5% by total weight (wt) of the liquid coating.

The coating compositions of the present invention can be made by mixing dry ingredients in the wet ingredients. The coating compositions having the filler amounts in the amounts suggested will have a viscosity suitable for the spray coating technique to be used to apply the coating.

Fillers which can be used with the present invention as either large, medium or small particles includes: calcium carbonate, limestone, titanium dioxide, sand, barium sulfate, clay, mica, dolomite, silica, talc, perlite, polymers, gypsum, wollastonite, calcite, aluminum trihydrate, pigments, zinc oxide, and zinc sulfate. The filler preferred for the large particle sizes is preferably selected from the group consisting of: limestone, dolomite, and sand, and mixtures thereof. The filler preferred for the medium particle sizes is preferably selected from the group consisting of: limestone, dolomite, and ground silica and mixtures thereof. The filler preferred for the small particle sizes is preferably selected from the group consisting of: calcium carbonate, titanium dioxide, clay, and mixtures thereof.

Binders which can be used with the present invention include epoxies, urethanes, melamine, polyesters, natural and modified natural polymers, and vinyl polymers. The polymers can include one or more of the following monomers vinyl acetate, vinyl propionate, vinyl butyrate, ethylene, vinyl chloride, vinylidine chloride, vinyl fluoride, vinylidene fluoride, ethyl acrylate, methyl acrylate, propyl acrylate, butyl acrylate, ethyl methacrylate, methyl methacrylate, butyl methacrylate, hydroxyethyl methylacrylate, styrene, butadiene, urethane, epoxy, melamine, and an ester. Examples of natural and modified natural polymers are protein and carbohydrate polymers such as starch. Preferred binders are polymers of one or more of the following monomers methyl methacrylate, butyl acrylate, and vinyl acetate.

Preferably these coatings are used on acoustical substrates (like ceiling boards). The visual surface of the substrate may include a scrim which is fixed to the ceiling board. The coating can be applied directly to the scrim before it is fixed to the board, or to the scrim after it is fixed on a board. Any scrim may be used. Suitable scrims include scrims made of cellullose, polypropylene, polyethylene, glass, polyester, polyamide, and mixtures thereof.

The coatings made by the present coating composition are discontinuous, thus providing a discontinuous finish required to allow sound to pass through to an acoustical substrate. Preferably these coating compositions are used on any substrate material having a noise reduction coefficient (NRC) equal to or greater than 55.

EXAMPLES

The ingredients for the coatings in the following examples were mixed together to form the coating composition. The coatings were then used to coat a fiber ceiling board that had a glass scrim surface. The board samples were then subjected to the tests indicated for each example.

The tongue scratch test (also called the finger scratch test) for each of the samples was used to test the scratch resistance of the paint coating surface of the ceiling board samples which were prepared. This test was conducted and can be repeated according to the following description.

Metal tongues (also called .fingers.) are securely arranged evenly in a row and each has a protruding length of approximately 1.875 inches. The tongues are steel, held at the same level, and have thicknesses which increase going from left to right. The tongue thicknesses are: (10, 12, 14, 16, 18, 20, 22, and 25 mils each. The board is put in a holder below these set of tongues and the tongues are allowed to overlap across the top edge of the board a distance of approximately 7/32 inches. The tongues are then drawn down across the board at a speed of 20 inches per minute. A thicker tongue will cause a scratch more easily. The thinnest tongue will scratch less easily. Thus, the .scratch resistance. rating given on the tested board in these examples is the thinnest tongue thickness which left a scratch on the board after the tongues were drawn across it. Thus, for example, under Example 5, the board was scratched at the tongue thicknesses of 20, 22, and 25 mils, then its scratch resistance is given below as 20.

Example #1

| Ingredient | Trademark Name | Company | Purpose | % of Total Wet Volume | % of Dry Solids Volume | % of Dry Filler Volume |
|---|---|---|---|---|---|---|
| Calcium Carbonate Slurry | Hydrocarb 60 Slurry - 75% | Omya Inc. | Medium Size Filler - 1.4 micron | 41.90 | 41.92 | 47.48 |
| Water | | | Vehicle | 21.27 | 0.00 | |
| Sodium Polyacrylate - 30% | Tamol 850 | Rohm & Haas | Dispersing Agent | 0.74 | 0.40 | |
| Titanium Dioxide | Tipure R-960 | Dupont Chemical | Small Size Filler - 0.2 micron | 1.85 | 3.71 | 4.20 |
| Calcined Clay | Ultrex 96 | Engelhard Corp. | Small Size Filler - 0.9 micron | 7.38 | 14.86 | 16.83 |
| Dolomitic Limestone | DF 5025 | Specialty Minerals | Large Size Filler - 125 micron | 13.88 | 27.80 | 31.49 |
| Acrylic Latex - 50% | Hycar 26256 | B.F. Goodrich | Binder | 12.86 | 11.27 | |

-continued

Example #1

| Ingredient | Trademark Name | Company | Purpose | % of Total Wet Volume | % of Dry Solids Volume | % of Dry Filler Volume |
|---|---|---|---|---|---|---|
| Hydroxyethyl Cellulose - 30% | Natrosol FPS - HB | Aqualon | Thickener | 0.12 | 0.04 | |

% Solids by Volume = 49.69
Viscosity = 1200 cps (Brookfield - 10 rpm)
Light Reflectance = 0.89 [Good Light Reflectance]
Scratch Resistance = 25 Good Scratch Resistance

Example #2 - Minimum Large Particle Size Filler:

| Ingredient | Trademark Name | Company | Purpose | % of Total Wet Volume | % of Dry Solids Volume | % of Dry Filler Volume |
|---|---|---|---|---|---|---|
| Calcium Carbonate Slurry | Hydrocarb 60 Slurry - 75% | Omya Inc. | Medium Size Filler - 1.4 micron | 49.41 | 49.72 | 56.29 |
| Water | | | Vehicle | 17.84 | 0.00 | |
| Sodium Polyacrylate - 30% | Tamol 850 | Rohm & Haas | Dispersing Agent | 0.74 | 0.40 | |
| Titanium Dioxide | Tipure R-960 | Dupont Chemical | Small Size Filler - 0.2 micron | 1.83 | 3.70 | 4.19 |
| Calcined Clay | Ultrex 96 | Engelhard Corp. | Small Size Filler - 0.9 micron | 7.32 | 14.91 | 16.88 |
| Dolomitic Limestone | DF 5025 | Specialty Minerals | Large Size Filler - 125 micron | 9.90 | 20.00 | 22.64 |
| Acrylic Latex - 50% | Hycar 26256 | B.F. Goodrich | Binder | 12.84 | 11.23 | |
| Hydroxyethyl Cellulose - 30% | Natrosol FPS - HB | Aqualon | Thickener | 0.12 | 0.04 | |

% Solids by Volume 49.41
Viscosity = 1200 cps (Brookfield - 10 rpm)
Light Reflectance = 0.89 [Good Light Reflectance]
Scratch Resistance = 25 [Good Scratch Resistance]

Example #3 - Minimum Medium Particle Size Filler:

| Ingredient | Trademark Name | Company | Purpose | % of Total Wet Volume | % of Dry Solids Volume | % of Dry Filler Volume |
|---|---|---|---|---|---|---|
| Calcium Carbonate Slurry | Hydrocarb 60 Slurry - 75% | Omya Inc. | Medium Size Filler - 1.4 micron | 25.23 | 25.00 | 28.31 |
| Water | | | Vehicle | 29.70 | 0.00 | |
| Sodium Polyacrylate - 30% | Tamol 850 | Rohm & Haas | Dispersing Agent | 0.74 | 0.40 | |
| Titanium Dioxide | Tipure R-960 | Dupont Chemical | Small Size Filler - 0.2 micron | 1.85 | 3.72 | 4.21 |
| Calcined Clay | Ultrex 96 | Engelhard Corp. | Small Size Filler - 0.9 micron | 7.39 | 15.08 | 17.08 |
| Dolomitic Limestone | DF 5025 | Specialty Minerals | Large Size Filler - 125 micron | 22.00 | 44.48 | 50.40 |
| Acrylic Latex - 50% | Hycar 26256 | B.F. Goodrich | Binder | 12.97 | 11.28 | |
| Hydroxyethyl Cellulose - 30% | Natrosol FPS - HB | Aqualon | Thickener | 0.12 | 0.04 | |

% Solids by Volume = 49.71
Viscosity = 1200 cps (Brookfield - 10 rpm)
Light Reflectance = 0.89 [Good Light Reflectance]
Scratch Resistance = 25 [Good Scratch Resistance]

Example #4 - Minimum Small Particle Size Filler:

| Ingredient | Trademark Name | Company | Purpose | % of Total Wet Volume | % of Dry Solids Volume | % of Dry Filler Volume |
|---|---|---|---|---|---|---|
| Calcium Carbonate Slurry | Hydrocarb 60 Slurry - 75% | Omya Inc. | Medium Size Filler - 1.4 micron | 56.74 | 57.07 | 64.68 |
| Water | | | Vehicle | 14.23 | 0.00 | |
| Sodium Polyacrylate - 30% | Tamol 850 | Rohm & Haas | Dispersing Agent | 0.75 | 0.41 | |
| Titanium Dioxide | Tipure R-960 | Dupont Chemical | Small Size Filler - 0.2 micron | 1.5 | 3.00 | 3.40 |
| Calcined Clay | Ultrex 96 | Engelhard Corp. | Small Size Filler - 0.9 micron | 0.00 | 0.00 | 0.00 |
| Dolomitic Limestone | DF 5025 | Specialty Minerals | Large Size Filler - 125 micron | 13.86 | 28.17 | 31.92 |
| Acrylic Latex - 50% | Hycar 26256 | B.F. Goodrich | Binder | 12.80 | 11.31 | |
| Hydroxyethyl Cellulose - 30% | Natrosol FPS - HB | Aqualon | Thickener | 0.12 | 0.04 | |

% Solids by Volume 49.35
Viscosity = 1200 cps (Brookfield - 10 rpm)
Light Reflectance = 0.85 [Acceptable Light Reflectance]
Scratch Resistance = 25 [Good Scratch Resistance]

Example #5 - having a low concentration of the Large Particle Size Filler:

| Ingredient | Trademark Name | Company | Purpose | % of Total Wet Volume | % of Dry Solids Volume | % of Dry Filler Volume |
|---|---|---|---|---|---|---|
| Calcium Carbonate Slurry | Hydrocarb 60 Slurry - 75% | Omya Inc. | Medium Size Filler - 1.4 micron | 54.75 | 54.78 | 62.02 |
| Water | | | Vehicle | 14.97 | 0.00 | |
| Sodium Polyacrylate - 30% | Tamol 850 | Rohm & Haas | Dispersing Agent | 0.74 | 0.40 | |
| Titanium Dioxide | Tipure R-960 | Dupont Chemical | Small Size Filler - 0.2 micron | 1.84 | 3.70 | 4.19 |
| Calcined Clay | Ultrex 96 | Engelhard Corp. | Small Size Filler - 0.9 micron | 7.35 | 14.85 | 16.81 |
| Dolomitic Limestone | DF 5025 | Specialty Minerals | Large Size Filler - 125 micron | 7.44 | 15.00 | 16.98 |
| Acrylic Latex - 50% | Hycar 26256 | B.F. Goodrich | Binder | 12.79 | 11.23 | |
| Hydroxyethyl Cellulose - 30% | Natrosol FPS - HB | Aqualon | Thickener | 0.12 | 0.04 | |

% Solids by Volume = 49.62
Viscosity = 1200 cps (Brookfield - 10 rpm)
Light Reflectance = 0.90
Scratch Resistance = 20 [Low Scratch Resistance]

Example #6 - having a low concentration of the Medium Particle Size Filler:

| Ingredient | Trademark Name | Company | Purpose | % of Total Wet Volume | % of Dry Solids Volume | % of Dry Filler Volume |
|---|---|---|---|---|---|---|
| Calcium Carbonate Slurry | Hydrocarb 60 Slurry - 75% | Omya Inc. | Medium Size Filler - 1.4 micron | 15.36 | 15.00 | 17.02 |
| Water | | | Vehicle | 34.36 | 0.00 | |
| Sodium Polyacrylate - 30% | Tamol 850 | Rohm & Haas | Dispersing Agent | 0.75 | 0.41 | |
| Titanium Dioxide | Tipure R-960 | Dupont Chemical | Small Size Filler - 0.2 micron | 1.86 | 3.74 | 4.25 |
| Calcined Clay | Ultrex 96 | Engelhard Corp. | Small Size Filler - 0.9 micron | 7.43 | 15.05 | 17.09 |
| Dolomitic Limestone | DF 5025 | Specialty Minerals | Large Size Filler - 125 micron | 27.00 | 54.29 | 61.64 |
| Acrylic Latex - 50% | Hycar 26256 | B.F. | Binder | 13.12 | 11.47 | |

-continued

Example #6 - having a low concentration of the Medium Particle Size Filler:

| Ingredient | Trademark Name | Company | Purpose | % of Total Wet Volume | % of Dry Solids Volume | % of Dry Filler Volume |
|---|---|---|---|---|---|---|
| Hydroxyethyl Cellulose - 30% | Natrosol FPS-HB | Goodrich Aqualon | Thickener | 0.12 | 0.04 | |

% Solids by Volume = 49.7
Viscosity = 1200 cps (Brookfield - 10 rpm)
Light Reflectance = 0.83 [Low Light Reflectance]
Scratch Resistance = 25

Example #7 - having a low concentration of the Small Particle Size Filler:

| Ingredient | Trademark Name | Company | Purpose | % of Total Wet Volume | % of Dry Solids Volume | % of Dry Filler Volume |
|---|---|---|---|---|---|---|
| Calcium Carbonate Slurry | Hydrocarb 60 Slurry - 75% | Omya Inc. | Medium Size Filler - 1.4 micron | 58.72 | 58.92 | 66.70 |
| Water | | | Vehicle | 12.97 | 0.00 | |
| Sodium Polyacrylate - 30% | Tamol 850 | Rohm & Haas | Dispersing Agent | 0.75 | 0.41 | |
| Titanium Dioxide | Tipure R-960 | Dupont Chemical | Small Size Filler - 0.2 micron | 0.77 | 1.50 | 1.70 |
| Calcined Clay | Ultrex 96 | Engelhard Corp. | Small Size Filler - 0.9 micron | 0.00 | 0.00 | 0.00 |
| Dolomitic Limestone | DF 5025 | Specialty Minerals | Large Size Filler - 125 micron | 13.88 | 27.91 | 31.60 |
| Acrylic Latex - 50% | Hycar 26256 | B.F. Goodrich | Binder | 12.79 | 11.22 | |
| Hydroxyethyl Cellulose - 30% | Natrosol FPS - HB | Aqualon | Thickener | 0.12 | 0.04 | |

% Solids by Volume 49.7
Viscosity = 1200 cps (Brookfield - 10 rpm)
Light Reflectance = 0.80 [Low Light Reflectance]
Scratch Resistance Pass = 25

Example #8 - having a high concentration of the Small Particle Size Filler:

| Ingredient | Trademark Name | Company | Purpose | % of Total Wet Volume | % of Dry Solids Volume | % of Dry Filler Volume |
|---|---|---|---|---|---|---|
| Calcium Carbonate Slurry | Hydrocarb 60 Slurry - 75% | Omya Inc. | Medium Size Filler - 1.4 micron | 15.29 | 15.42 | 17.47 |
| Water | | | Vehicle | 34.26 | 0.00 | |
| Sodium Polyacrylate - 30% | Tamol 850 | Rohm & Haas | Dispersing Agent | 0.75 | 0.40 | |
| Titanium Dioxide | Tipure R-960 | Dupont Chemical | Small Size Filler - 0.2 micron | 1.85 | 3.70 | 4.19 |
| Calcined Clay | Ultrex 96 | Engelhard Corp. | Small Size Filler - 0.9 micron | 15.16 | 30.00 | 34.00 |
| Dolomitic Limestone | DF 5025 | Specialty Minerals | Large Size Filler - 125 micron | 19.68 | 39.12 | 44.34 |
| Acrylic Latex - 50% | Hycar 26256 | B.F. Goodrich | Binder | 13.01 | 11.36 | |
| Hydroxyethyl Cellulose - 30% | Natrosol FPS - HB | Aqualon | Thickener | 0.00 | 0.00 | |

% Solids by Volume 49.99
Viscosity 18000 cps (Brookfield - 10 rpm) [Too thick for convenient application]
Light Reflectance = 0.89
Scratch Resistance Pass = 25

We claim:

1. A coating composition for ceiling boards comprises water, a binder and a filler, said filler containing large particles with an average particle size of a minimum of about 50 microns, these large particles are present at an amount effective to obtain a coating composition which will make a durable, scratch resistant coat, medium particles with an average particle size in the range of from about 1.2 to about 30 microns, and small particles which have an average particle size in the range of from about 0.1 to about 1.0 microns, the small particles being present at a minimum amount of about 3% by dry solids volume, said amount being low enough to be effective to keep the coating composition at a low enough viscosity for spray application, the medium particles being present at an amount which is effective to give the coating the ability to make a coat having a light reflectance of at least about 0.84 as measured by ASTM E 1477-92.

2. The coating composition of claim 1 having the large particle size in the range of from about 50 to about 300 microns.

3. The coating composition of claim 1 having the large particles present at a concentration as low as about 15% by dry solids volume.

4. The coating composition of claim 1 having the small particles present at a concentration of from about 3 to about 25%.

5. The coating composition of claim 1 having the large particles present at a concentration from about 20 to about 55% of the total dry solids volume.

6. The coating composition of claim 1 having the medium particles present at a concentration from about 25 to about 70% by dry solids volume.

7. The coating composition of claim 1 having a total solids content in the range of from about 40 to about 70% by wet coating volume.

8. The coating composition of claim 1 wherein the filler for the large particle sizes is selected from the group consisting of: limestone, dolomite, sand, and mixtures thereof.

9. The coating composition of claim 1 wherein the filler for the medium particle sizes is selected from the group consisting of: limestone, dolomite, ground silica, and mixtures thereof.

10. The coating composition of claim 1 wherein the filler for the small particle sizes is selected from the group consisting of: calcium carbonate, titanium dioxide, clay, and mixtures thereof.

11. The coating composition of claim 1 wherein the binder is a polymer having one or more of the following monomers: vinyl acetate, vinyl propionate, vinyl butyrate, ethylene, vinyl chloride, vinylidine chloride, vinyl fluoride, vinylidene fluoride, ethyl acrylate, methyl acrylate, propyl acrylate, butyl acrylate, ethyl methacrylate, methyl methacrylate, butyl methacrylate, hydroxyethyl, methylacrylate, styrene, butadiene, urethane, epoxy, melamine, and an ester.

12. The coating composition of claim 1 wherein the small, medium and large fillers can be a material selected from the group consisting of calcium carbonate, limestone, titanium dioxide, sand, barium sulfate, clay, mica, dolomite, silica, talc, perlite, polymers, gypsum, wollastonite, calcite, aluminum trihydrate, pigments, zinc oxide, zinc sulfate, and mixtures thereof.

13. A coating composition for ceiling boards comprising:

water;

a binder; and a filler, said filler comprising large particles having an average particle size of at least about 50 microns, medium particles having an average particle size in the range of from about 1.2 to about 30 microns, and small particles having an average particle size in the range of from about 0.1 to about 1.0 micron, wherein said composition is sprayable, has a scratch resistance of at least about 20, and the ability to make a coat having a light reflectance of at least about 0.84 as measured by ASTM E 1477-92.

14. A coated ceiling board comprising:

a substrate having a visual surface; and a discontinuous coat comprising a coating composition as claimed in claim 13 disposed on the visual surface.

15. A coated ceiling board comprising a substrate having a visual surface which has a discontinuous coat including a binder and a filler, said filler containing large particles with an average particle size of a minimum of about 50 microns, these large particles are present at an amount effective to obtain a coating composition which will make a durable, scratch resistant coat, medium particles with an average particle size in the range of from about 1.2 to about 30 microns, and small particles which have an average particle size in the range of from about 0.1 to about 1.0 microns, the small particles being present at a minimum amount of about 3% by dry solids volume, said amount being low enough to be effective to keep the coating composition at a low enough viscosity for spray application, the medium particles being present at an amount which is effective to give the coating the ability to make a coat having a light reflectance of at least about 0.84 as measured by ASTM E 1477-92.

16. The ceiling board of claim 15 wherein the substrate is a ceiling board having a noise reduction coefficient equal to or greater than 55.

17. The ceiling board of claim 15 wherein the coat is on a scrim.

18. The ceiling board of claim 17 wherein the scrim is made of a material selected from the group consisting of cellullose, polypropylene, polyethylene, glass, polyester, polyamide, and mixtures thereof.

* * * * *

UNITED STATES PATENT AND TRADEMARK OFFICE
CERTIFICATE OF CORRECTION

PATENT NO. : 6,103,360
DATED : August 15, 2000
INVENTOR(S) : Kenneth G. Caldwell and Raymond H. Fernando It is certified that error appears in the above-identified patent and that said Letters Patent is hereby corrected as shown below:

Column 1, line 16, change "for acoustical" to --for an acoustical--.
Column 2, line 48, change "per minute 20 (rpm)." to --per minute (rpm).
Column 4, line 30, change ".fingers." to --"fingers"--.
Column 4, line 35, change "25 mils each" to --25 mils each)--.
Column 4, line 41, change ".scratch resistance." to --scratch resistance--.

Signed and Sealed this

Twenty-fourth Day of April, 2001

Attest:

NICHOLAS P. GODICI

Attesting Officer    Acting Director of the United States Patent and Trademark Office